US011316386B2

(12) United States Patent
Wu et al.

(10) Patent No.: US 11,316,386 B2
(45) Date of Patent: Apr. 26, 2022

(54) COMMUNICATION METHOD AND DEVICE FOR WIRELESS CHARGING

(71) Applicant: Beijing Xiaomi Mobile Software Co., Ltd., Beijing (CN)

(72) Inventors: Kaiqi Wu, Beijing (CN); Yanteng Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 177 days.

(21) Appl. No.: 16/713,207

(22) Filed: Dec. 13, 2019

(65) Prior Publication Data

US 2020/0381958 A1     Dec. 3, 2020

(30) Foreign Application Priority Data

May 31, 2019   (CN) .......................... 201910467388.9

(51) Int. Cl.
*H02J 50/80*    (2016.01)
*H04W 4/80*    (2018.01)
*H02J 7/00*    (2006.01)
*H04W 72/12*    (2009.01)

(52) U.S. Cl.
CPC .......... *H02J 50/80* (2016.02); *H02J 7/00034* (2020.01); *H04W 4/80* (2018.02); *H04W 72/1247* (2013.01)

(58) Field of Classification Search
CPC ........ H02J 50/00; H02J 50/80; H02J 7/00034; H04L 69/14; H04W 4/80; H04W 4/90; H04W 72/1247
See application file for complete search history.

(56) References Cited

U.S. PATENT DOCUMENTS

| 10,110,030 B1 | 10/2018 | Colosimo et al. |
| 2008/0052394 A1 | 2/2008 | Bugenhagen et al. |
| 2010/0013322 A1 | 1/2010 | Sogabe et al. |
| 2012/0034912 A1 | 2/2012 | Kamdar et al. |
| 2012/0314745 A1 | 12/2012 | Tsai et al. |
| 2013/0286892 A1 | 10/2013 | Fuste Vilella et al. |

(Continued)

FOREIGN PATENT DOCUMENTS

| CN | 103107605 A | 5/2013 |
| CN | 103988391 A | 8/2014 |

(Continued)

OTHER PUBLICATIONS

Office Action of Russian Application No. 2019141196/07, dated Aug. 25, 2020.

(Continued)

*Primary Examiner* — David Bilodeau
(74) *Attorney, Agent, or Firm* — Finnegan, Henderson, Farabow, Garrett & Dunner, L.L.P.

(57) ABSTRACT

A communication method for wireless charging includes: transmitting a data packet to a wireless power transmitting device by in-band communication, if emergency data needs to be transmitted during a wireless charging process; and transmitting the data packet to the wireless power transmitting device by out-of-band communication, if non-emergency data needs to be transmitted during the wireless charging process; wherein a requirement for a transmission delay of the emergency data is higher than a requirement for a transmission delay of the non-emergency data.

6 Claims, 5 Drawing Sheets

(56) References Cited

U.S. PATENT DOCUMENTS

| | | | |
|---|---|---|---|
| 2015/0015419 A1 | 1/2015 | Halker et al. | |
| 2015/0372496 A1* | 12/2015 | Lee | H02J 50/80 307/104 |
| 2016/0014793 A1 | 1/2016 | Klemp et al. | |
| 2016/0099604 A1* | 4/2016 | Von Novak, III | H02J 5/005 320/108 |
| 2016/0197486 A1 | 7/2016 | Von Novak, III et al. | |
| 2016/0268815 A1* | 9/2016 | Lee | H02J 50/40 |
| 2018/0006495 A1* | 1/2018 | Carobolante | H02J 50/12 |
| 2018/0342907 A1 | 11/2018 | Dimke et al. | |
| 2019/0013687 A1* | 1/2019 | Shevde | H02J 7/0047 |

FOREIGN PATENT DOCUMENTS

| | | |
|---|---|---|
| CN | 104281802 A | 1/2015 |
| CN | 104426361 A | 3/2015 |
| CN | 104868521 A | 8/2015 |
| CN | 105210254 A | 12/2015 |
| CN | 107426826 A | 12/2017 |
| CN | 107690741 A | 2/2018 |
| CN | 107863989 A | 3/2018 |
| CN | 109075617 A | 12/2018 |
| JP | 2007-325339 | 12/2007 |
| JP | 2014-50271 | 3/2014 |
| JP | 2015-109785 | 6/2015 |
| KR | 20110134970 A | 12/2011 |
| KR | 2016/0133140 A | 11/2016 |
| RU | 2568606 C2 | 11/2015 |
| RU | 2656613 C2 | 6/2018 |

OTHER PUBLICATIONS

First Office Action of Chinese Application No. 201910467388.9, dated May 8, 2021.

Notice of Allowance of Korean Application No. 10-2019-7028121, dated Apr. 22, 2021.

Begum, F., et al., Interference Suppression using CPP Adaptive Notch Filters for UWB Synchronization in Stochastic Non-Linear Channels, Technical University—Sofia, Technical University—Sofia, Sofia 1000, "Kl. Ohridski" 8, Bulgaria, University of Craiova, Craiova, Romania, IEEE, 2014, 8 pages.

Xu Ruichen, Research on Wireless Charging Device EMC Testing, Telecommunications Science, Oct. 9, 2014, 8 pages.

English version of International Search Report in Application No. PCT/CN2019/098351, from the China National Intellectual Property Administration (ISA/CN), dated Mar. 6, 2020.

Extended European Search Report for European Application No. 20151020.3, dated Apr. 22, 2020.

International Search Report for Chinese Application No. PCT/CN2019/098351, dated Mar. 6, 2020.

Office Action dated Jun. 28, 2021, from the European Patent Office issued in counterpart European Application No. 20151020.3.

* cited by examiner

COMMUNICATION METHOD AND DEVICE FOR WIRELESS CHARGING

CROSS-REFERENCE TO RELATED APPLICATIONS

The present application is based on and claims priority to Chinese Patent Application No. 201910467388.9, filed on May 31, 2019, the entire contents of which are hereby incorporated by reference.

TECHNICAL FIELD

The present application relates to the field of wireless charging technologies, and in particular, to a communication method and device for wireless charging.

BACKGROUND

Currently, some phones support wireless charging. The wireless charging is implemented in the manners including electromagnetic induction, electromagnetic resonance, electric field coupling, radio waves, and the like.

Wireless charging standards proposed by the Wireless Power Consortium (WPC) stipulate that necessary communication between a wireless charging charger and a charged device can be performed based on an operating frequency band of the wireless charging, and this communication manner is called in-band communication.

SUMMARY

According to an aspect of the embodiment of the present disclosure, a communication method for wireless charging is provided, which is applied to a wireless power receiving device, including: transmitting a data packet to a wireless power transmitting device by in-band communication, if emergency data needs to be transmitted during a wireless charging process; and transmitting the data packet to the wireless power transmitting device by out-of-band communication, if non-emergency data needs to be transmitted during the wireless charging process, wherein a requirement of a transmission delay for the emergency data is higher than a requirement for a transmission delay of the non-emergency data.

According to another aspect of the embodiment of the present disclosure, a communication method for wireless charging is provided, which is applied to a wireless power transmitting device, including: receiving a plurality of data packets transmitted by a wireless power receiving device; determining a communication manner for the data packet, wherein the communication manner includes in-band communication and out-of-band communication; preferentially processing one or more data packets, of the plurality of data packets, transmitted by the in-band communication.

According to another aspect of the embodiment of the present disclosure, a wireless power receiving device, includes: a processor; and a memory for storing instructions executable by the processor; wherein the processor is configured to: transmit a data packet to a wireless power transmitting device by in-band communication, if emergency data needs to be transmitted during a wireless charging process; and transmit the data packet to the wireless power transmitting device by out-of-band communication, if non-emergency data needs to be transmitted during the wireless charging process; wherein a requirement for a transmission delay of the emergency data is higher than a requirement for a transmission delay of the non-emergency data.

According to another aspect of the embodiment of the present disclosure, a wireless power transmitting device, includes: a processor; and a memory for storing instructions executable by the processor; wherein the processor is configured to: receive a plurality of data packets transmitted by a wireless power receiving device; determine a communication manner used for the data packet, wherein the communication manner includes in-band communication and out-of-band communication; preferentially process one or more data packets, of the plurality of data packets, transmitted by the in-band communication.

The technical solutions provided by the embodiments of the present disclosure may include the following beneficial effects.

In the wireless charging process, if emergency data needs to be transmitted, an in-band communication manner is used to transmit a data packet to a wireless power transmitting device; if non-emergency data needs to be transmitted, an out-of-band communication manner is used to transmit a data packet to a wireless power transmitting device. Compared with the related art where a single in-band communication manner is adopted, the method provided by the embodiments of the present application transmits the data packet with a lower transmission delay requirement by using the out-of-band communication with better communication quality when the non-emergency data needs to be transmitted, which is beneficial to improving the demodulation success rate of the data packet, while transmits the data packet with a higher transmission delay requirement by using the in-band communication when the emergency data needs to be transmitted, thereby ensuring that the wireless power transmitting device can process the data packet in time in the case that the emergency data needs to be transmitted.

It should be understood that the above general description and the following detailed description are merely exemplary and explanatory and should not be construed as limiting of the disclosure.

DETAILED DESCRIPTION

Embodiments of the present disclosure will be described in detail with reference to the accompanying drawings. The following description refers to the accompanying drawings in which the same numbers in different drawings represent the same or similar elements, unless otherwise represented. The implementations set forth in the following exemplary embodiments do not represent all implementations consistent with the present disclosure. Instead, they are merely examples of devices and methods consistent with aspects related to the present disclosure as recited in the appended claims.

Figure 1:
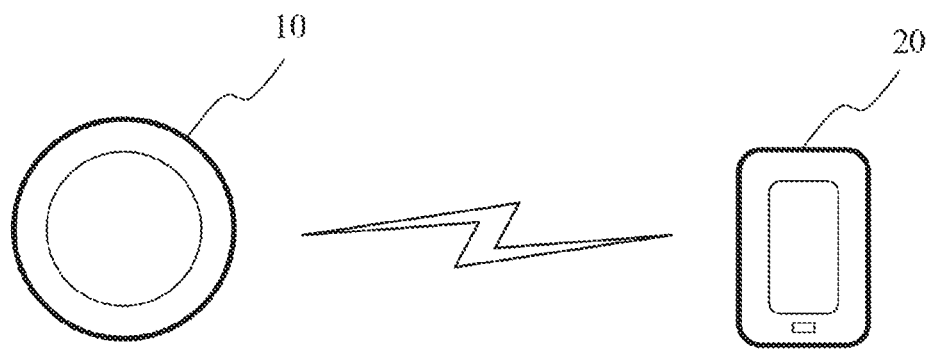
FIG. 1 shows a schematic diagram of an implementation environment according to an exemplary embodiment.

FIG. 1 is a schematic diagram of an implementation environment according to an exemplary embodiment. The implementation environment includes a wireless power transmitting device 10 and a wireless power receiving device 20.

The wireless power transmitting device 10 may be a device for providing power to an electric device in wireless charging. Names of the wireless power transmitting devices 10 may vary in different service scenarios. For example, when the wireless power transmitting device 10 is for wirelessly charging a portable electronic device such as a mobile phone, a tablet computer, or a wearable device, the wireless power transmitting device 10 may be referred to as a charger, a charging disk, a power adapter, a wireless charger, or the like. For another example, when the wireless power transmitting device 10 is for wirelessly charging a vehicle such as an electric car, the wireless power transmitting device 10 may be referred to as a charging post, a wireless charging post, or the like.

The wireless power receiving device 20 may be a device for receiving power in wireless charging, that is, an electric device. The wireless power receiving device 20 can be any electric device that supports the wireless charging, such as a mobile phone, a tablet computer, a wearable device, an electric vehicle, and the like, which is not limited in the embodiments of the present disclosure.

In an embodiment, the communication manner for the wireless charging between the wireless power transmitting device 10 and the wireless power receiving device 20 includes at least one of in-band (or intraband) communication or out-of-band communication. For example, the in-band communication is a communication manner based on an operating frequency band of the wireless charging, and the out-of-band communication is a communication manner using a non-operating frequency band of the wireless charging. In FIG. 1, during the in-band communication process, the wireless power transmitting device 10 and the wireless power receiving device 20 perform communication based on the operating frequency band of wireless charging; during the out-of-band communication process, the wireless power transmitting device 10 and the wireless power receiving device 20 communicate, through an out-of-band communication component, in the operating frequency band of the out-of-band communication component, which is a frequency band other than the operating frequency band of the wireless charging. In an embodiment, the out-of-band communication component may be at least one of a Bluetooth chip, a near-field communication (NFC) chip, and a ZigBee chip.

Figure 2:
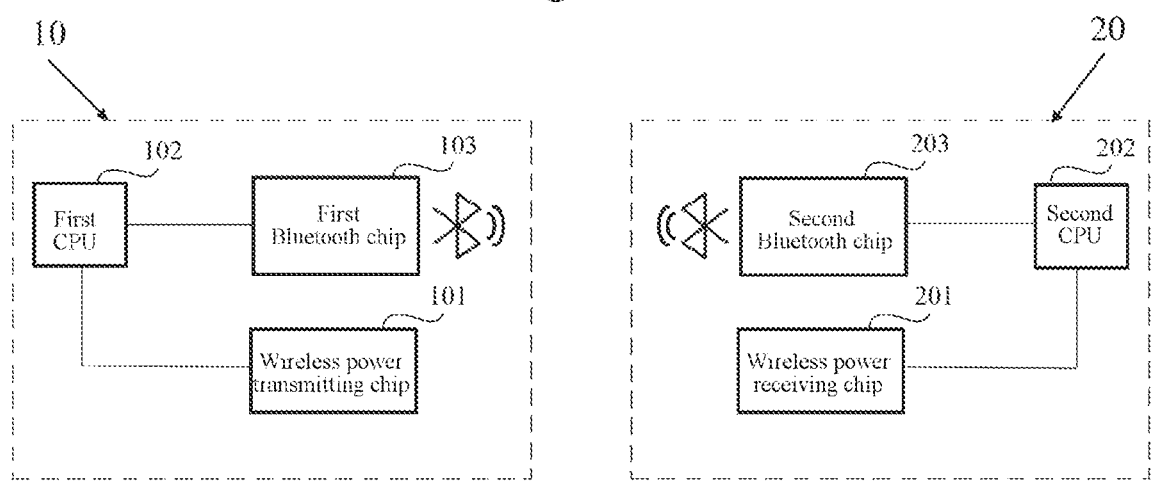
FIG. 2 shows a schematic diagram of a wireless power transmitting device and a wireless power receiving device according to an exemplary embodiment.

FIG. 2 are schematic diagrams of the wireless power transmitting device 10 and the wireless power receiving device 20 according to an exemplary embodiment. In the embodiment, the wireless power transmitting device 10 and the wireless power receiving device 20 perform out-of-band communication through, e.g., a Bluetooth chip.

As shown in FIG. 2, the wireless power transmitting device 10 is provided with a wireless power transmitting chip 101 connected to a first central processing unit (CPU) 102, wherein the first CPU 102 is connected to a first Bluetooth chip 103, and the wireless power receiving device 20 is provided with a wireless power receiving chip 201 connected to a second CPU 202, wherein the second CPU 202 is connected to a second Bluetooth chip 203.

During the out-of-band communication, the wireless power receiving device 20 communicates with the second CPU 202 through the wireless power receiving chip 201, and transmits a data packet that needs to be transmitted to the second CPU 202, and the second CPU 202 transmits the data packet to the second Bluetooth chip 203, so that the second Bluetooth chip 203 transmits the data packet to the first Bluetooth chip 103 through a Bluetooth connection (out-of-band communication). Correspondingly, after the wireless power transmitting device 10 receives the data packet transmitted by the wireless power receiving device 20 with the out-of-band communication through the first Bluetooth chip 103, the wireless power transmitting device 10 transmits the data packet to the first CPU 102, and the first CPU 102 transmits the data packet to the wireless power transmitting chip 101, so that the wireless power transmitting chip 101 performs a parsing process on the data packet. The wireless power transmitting device 10 can provide a feedback on the data packet transmitted by the wireless power receiving device 20 through a process similar to the above described process.

Figure 3:
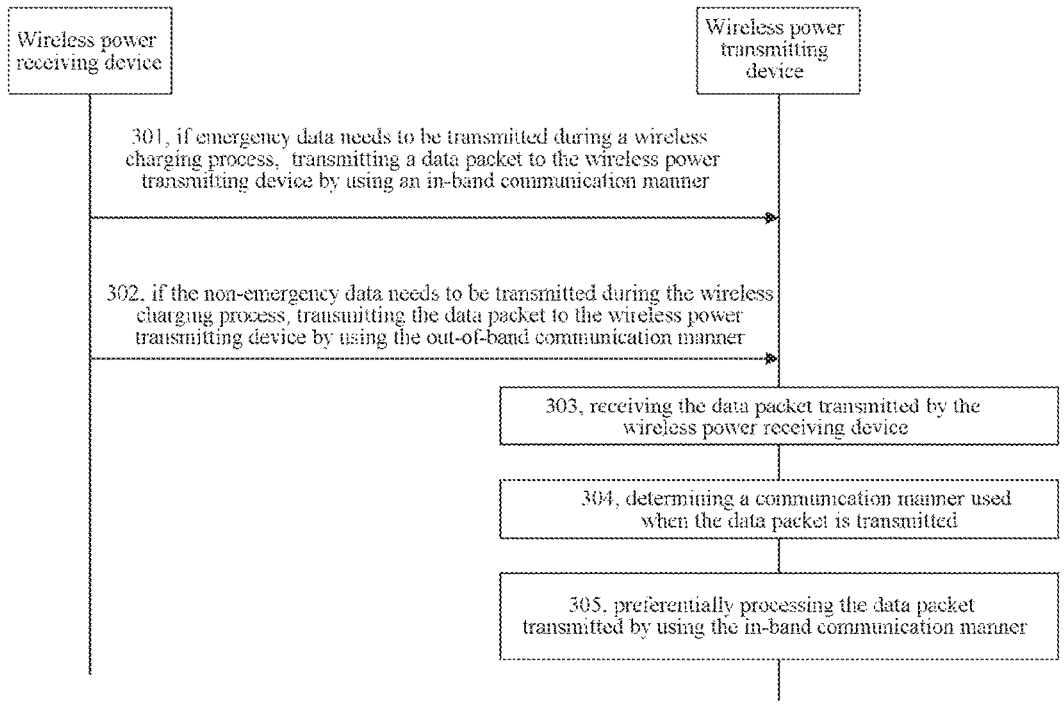
FIG. 3 shows a flowchart of a communication method for wireless charging according to an exemplary embodiment.

FIG. 3 is a flowchart of a communication method for wireless charging according to an exemplary embodiment. The method may be applied to the implementation environment described above in FIG. 1, and may include the following steps.

In step 301, if emergency data needs to be transmitted during a wireless charging process, the wireless power receiving device transmits a data packet to the wireless power transmitting device by using the in-band communication manner.

In an embodiment, the wireless power receiving device determines whether the device needs to transmit emergency data or non-emergency data. If the emergency data needs to be transmitted, the step 301 is performed; if the non-emergency data needs to be transmitted, the step 302 is performed. In an embodiment, a requirement of a transmission delay of the emergency data is higher than a requirement of a transmission delay of the non-emergency data. That is, compared with the non-emergency data, the emergency data needs to be transmitted to the wireless power transmitting device faster, so that the wireless power transmitting device can process it as soon as possible.

In an embodiment, the in-band communication has two communication links between the transmitting end (the wireless power transmitting device) and the receiving end (the wireless power receiving device). Wherein, the communication from the receiving end to the transmitting end adopts an amplitude shift keying (ASK) modulation mode, and the communication from the transmitting end to the receiving end adopts a frequency shift keying (FSK) modulation mode.

When the emergency data needs to be transmitted, the wireless power receiving device generates a corresponding data packet according to the current situation in which the emergency data needs to be transmitted, and transmits the data packet to the wireless power transmitting device by using the ASK modulation method to instruct the wireless power transmitting device to process the received data packet.

In step 302, if the non-emergency data needs to be transmitted during the wireless charging process, the wireless power receiving device transmits the data packet to the wireless power transmitting device by using the out-of-band communication manner.

The non-emergency data is the data excluding the emergency data. The requirement for a transmission delay of the non-emergency data is lower than the requirement of a transmission delay of the emergency data. The wireless power receiving device can transmit the data packet through the out-of-band communication. The transmission delay in out-of-band communication is longer than that in the in-band communication, but communication quality of the out-of-band communication is higher than that of the in-band communication. Therefore, when transmitting the non-emergency data, the wireless power receiving device transmits the data packet by using the out-of-band communication, thereby ensuring the transmission quality of the data packet, and improving the parsing success rate of the data packet by the wireless power transmitting device.

In an embodiment, when the wireless power receiving device determines to adopt out-of-band communication, the wireless power receiving device also needs to enable the out-of-band communication function. In an embodiment, when the out-of-band communication is required between a mobile phone (an example of the wireless power receiving device) and a wireless charging pad (an example of the wireless power transmitting device), and the out-of-band communication manner is the Bluetooth mode, a prompt box will appear on an interface of the mobile phone, and the prompt box is used to prompt the user to manually enable the Bluetooth function. In an embodiment, the mobile phone automatically turns on the Bluetooth function backstage, thereby the out-of-band communication between the mobile phone and the wireless charging pad is implemented.

In step 303, the wireless power transmitting device receives the data packet transmitted by the wireless power receiving device.

In the wireless charging process, the wireless power transmitting device turns on the in-band communication mode and the out-of-band communication mode. Different from the related art in which the wireless power transmitting device can only receive the data packet transmitted by the wireless power receiving device in the in-band communication manner during the wireless charging process, the wireless power transmitting device simultaneously enables the in-band communication manner and the out-of-band communication manner in the embodiment, thereby ensuring that the data packet transmitted by the wireless power receiving device through in-band communication or out-of-band communication can be normally received.

In an embodiment, before entering the wireless charging process (for example, in an identifying configuration phase), the wireless power transmitting device detects whether the wireless power receiving device supports the out-of-band communication, and when the wireless power receiving device supports the out-of-band communication, the in-band communication manner and the out-of-band communication manner are enabled simultaneously during the wireless charging process; otherwise, only the in-band communication manner is enabled.

In step 304, the wireless power transmitting device determines a communication manner used when transmitting the data packet.

In an embodiment, the communication manner includes the in-band communication manner and the out-of-band communication manner. For example, the wireless power transmitting device receives the data packet transmitted by the wireless power receiving device by using the in-band communication manner, and/or receives the data packet transmitted by the wireless power receiving device by using the out-of-band communication manner.

In an embodiment, after receiving the data packet, the wireless power transmitting device determines the communication manner used when the wireless power receiving device transmits the data packet, and the communication manner of the data packet transmitted by the wireless power receiving device when the emergency data needs to be transmitted is determined as the in-band communication manner, and the communication manner of the data packet transmitted by the wireless power receiving device when the non-emergency data needs to be transmitted is determined as the out-of-band communication manner.

In step 305, the wireless power transmitting device preferentially processes the data packet transmitted by using the in-band communication manner.

In an embodiment, in order to improve the processing speed of the emergency data by the wireless power transmitting device, so as to cancel the emergency status of the wireless power receiving device as soon as possible, data packets transmitted by using different communication manners may have different processing priorities, and the wireless power transmitting device processes a data packet according to the processing priority of the data packet, instead of processing the data packets in the order of receiving.

In an embodiment, the wireless power transmitting device receives the data packet transmitted by using the in-band communication manner and the data packet transmitted by using the out-of-band communication manner, wherein the processing priority of the data packet transmitted by using the in-band communication manner is higher than the processing priority of the data packet transmitted in the out-of-band communication manner. That is, when the wireless power transmitting device receives the data packet transmitted in the in-band communication manner, the data packet transmitted in the in-band communication manner is preferentially processed.

In the embodiment of the present disclosure, if the emergency data needs to be transmitted during the wireless charging process, the in-band communication manner is used to transmit a data packet to the wireless power transmitting device; if the non-emergency data needs to be transmitted during the wireless charging process, the out-of-band communication manner is used to transmit a data packet to a wireless power transmitting device. In the embodiment of the present application, when the non-emergency data needs to be transmitted, the data packet for which the transmission delay requirement is low, is transmitted in the out-of-band communication manner with the better communication quality, which is beneficial to improving the demodulation success rate of the data packet. Moreover, when the emergency data needs to be transmitted, the data packet for which the transmission delay requirement is higher, is transmitted in the in-band communication manner, thereby ensuring that the wireless power transmitting device can process the data packet in time in the case that the emergency data needs to be transmitted.

In an embodiment, in order to further improve the processing efficiency of the emergency data, when the emergency data needs to be transmitted during the wireless charging process, the wireless power receiving device preferentially generates the data packet corresponding to the emergency data. For the non-emergency data needed to be transmitted, the wireless power receiving device generates the data packet corresponding to the non-emergency data after generating the data packet corresponding to the emergency data.

In an embodiment, during the wireless charging process, the wireless power receiving device determines that emergency data needs to be transmitted in at least one of the following emergency situations: a control error value included in a control error packet (CEP) is greater than an error threshold, an output current of the wireless power receiving device is greater than a first threshold, a device temperature of the wireless power receiving device is greater than a second threshold, and a timer status of the timer in the wireless power receiving device is a time-out status. The above various situations in which emergency data needs to be transmitted will be described below using an exemplary embodiment.

Figure 4:
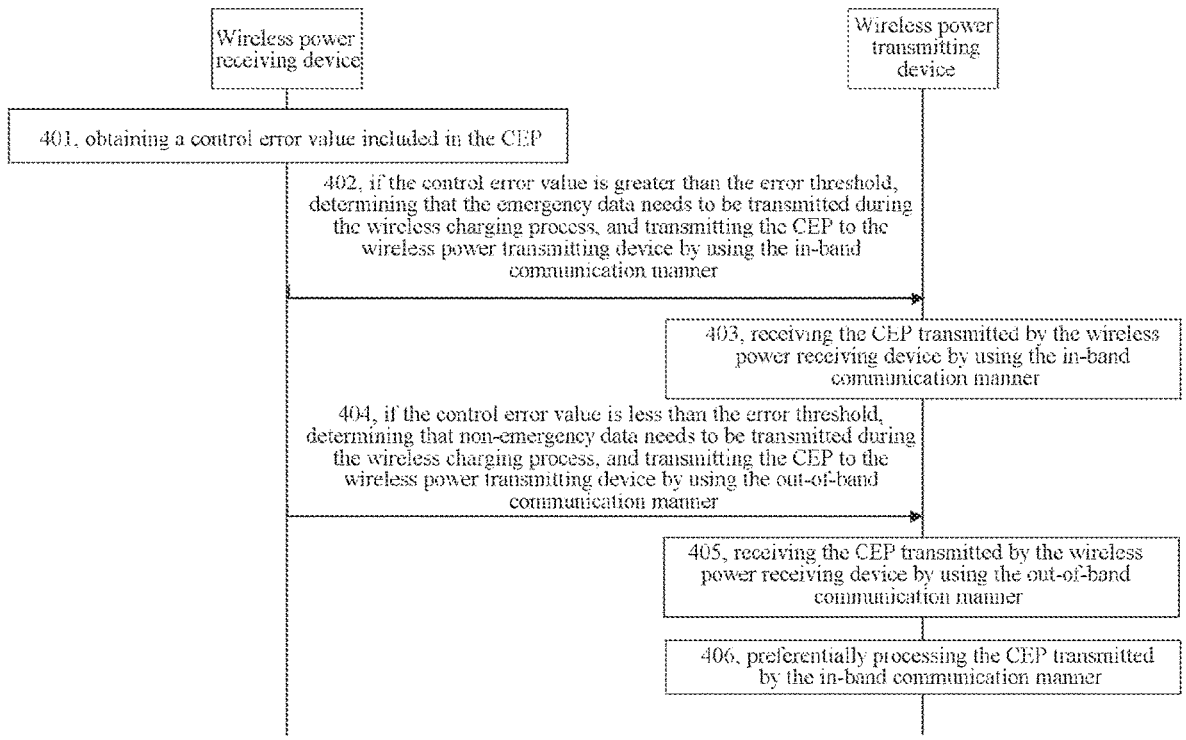
FIG. 4 shows a flowchart of a communication method for wireless charging according to another exemplary embodiment.

FIG. 4 is a flowchart of a communication method for wireless charging according to another exemplary embodiment. In this embodiment, the emergency status is related to a CEP. The method may include the following steps.

In step 401, the wireless power receiving device obtains a control error value included in the CEP.

In an embodiment, the CEP is used to instruct the wireless power transmitting device to adjust at least one of a voltage, a current, and an operating frequency, and the CEP includes a control error value ranging from −128 to +127, that is, the control error value may be positive or negative.

In the related art, during the wireless charging process, the wireless power receiving device transmits the CEP to the wireless power transmitting device by using an in-band communication manner according to a predetermined time interval (for example, 250 ms), and the wireless power transmitting device receives the CEP and demodulates the control error value included therein. When the control error value is a positive number, the wireless power transmitting device increases the current of a primary coil (the primary coil is located in the wireless power transmitting device), or increases voltage, or, reduces its own operating frequency when the voltage of the wireless power transmitting device reaches a maximum value. When the control error value is a negative number, the wireless power transmitting device reduces the current of the primary coil, or increases its own operating frequency, or lowers its own voltage when the operating frequency of the wireless power transmitting device reaches a maximum value.

While in the embodiment of the present disclosure, the wireless power receiving device may detect the control error value of the CEP before the CEP is transmitted, and determine whether the control error value is greater than the error threshold. If the control error value is greater than the error threshold, the step 402 is performed. If the control error value is less than the error threshold, the step 404 is performed.

In an embodiment, the error threshold is a positive value, and when the wireless power receiving device compares the control error value with the error threshold, the absolute value of the control error value is compared with the error threshold.

In step 402, if the control error value is greater than the error threshold, the wireless power receiving device determines that the emergency data needs to be transmitted during the wireless charging process, and transmits the CEP to the wireless power transmitting device by using the in-band communication manner.

If the control error value is greater than the error threshold, it indicates that the adjustment amount at the wireless power transmitting device is relatively large (a relatively large adjustment of the current, the voltage or the operating frequency is required). If the wireless power transmitting device is adjusted too slowly, it may cause damage to the wireless power receiving device. Therefore, in the case that the control error value is greater than the error threshold, the wireless power receiving device transmits the CEP by using the in-band communication manner, so that the wireless power receiving device transmits the CEP to the wireless power transmitting device as soon as possible, thereby ensuring that the wireless power transmitting device can timely process CEP in the case in which the emergency data needs to be transmitted.

In an embodiment, the control error value is −90. When the absolute value of the control error value is detected to be greater than the error threshold 80, the wireless power receiving device determines that the emergency data needs to be transmitted during the wireless charging process, and transmits the CEP to the wireless power transmitting device by using the in-band communication manner.

In step 403, the wireless power transmitting device receives the CEP transmitted by the wireless power receiving device by using the in-band communication manner.

Since the wireless power transmitting device simultaneously enables the in-band communication and the out-of-band communication, when the wireless power receiving device transmits the CEP by using the in-band communication manner, the wireless power transmitting device can receive the CEP in the in-band communication manner in time.

In step 404, if the control error value is less than the error threshold, the wireless power receiving device determines that non-emergency data needs to be transmitted during the wireless charging process, and transmits the CEP to the wireless power transmitting device by using the out-of-band communication manner.

If the control error value is smaller than the error threshold, it indicates that the adjustment amount at the wireless power transmitting device is relatively small, and even if the wireless power transmitting device adjusts slowly, the wireless power receiving device may not be greatly affected. Therefore, when the non-emergency data needs to be transmitted during the wireless charging process, the wireless power receiving device transmits CEP by using the out-of-band communication manner with better communication quality but higher transmission delay, thereby ensuring the transmission quality of the CEP and improving the resolution success rate of CEP by wireless power transmitting equipment.

In an embodiment, the control error value is +10. When it is detected that the absolute value of the control error value is less than the error threshold 80, the wireless power receiving device determines that the non-emergency data needs to be transmitted during the wireless charging process, and transmits the CEP to the wireless power transmitting device by using the out-of-band communication manner.

In step 405, the wireless power transmitting device receives the CEP transmitted by the wireless power receiving device by using the out-of-band communication manner.

Similarly, since the wireless power transmitting device simultaneously enables the in-band communication and the out-of-band communication, when the wireless power receiving device transmits the CEP through the out-of-band communication manner, the wireless power transmitting device can receive the CEP in the out-of-band communication manner in time.

In step 406, the wireless power transmitting device preferentially processes the CEP transmitted in the in-band communication manner.

Correspondingly, the wireless power transmitting device obtains the CEP and adjusts at least one of the voltage, the current, and the operating frequency according to the control error in the CEP.

In an embodiment, the wireless power transmitting device receives the CEP transmitted by using the in-band communication manner and the CEP transmitted by using the out-of-band communication manner, wherein the processing priority of the CEP transmitted by using the in-band communication manner is higher than the processing priority of the CEP transmitted in the out-of-band communication manner. That is, when the wireless power transmitting device receives the CEP transmitted in the in-band communication manner, the CEP transmitted in the in-band communication manner is preferentially processed.

In this embodiment, during the wireless charging process, the wireless power receiving device obtains the control error value included in the CEP, and when the control error value is greater than the error threshold, it is determined that the emergency data needs to be transmitted during the wireless charging process, and the in-band communication manner is used to transmit the CEP to the wireless power transmitting device; when the control error value is less than the error threshold, it is determined that the non-emergency data needs to be transmitted during the wireless charging process, and the out-of-band communication manner is used to transmit the CEP to the wireless power transmitting device. Compared with the related art where a single in-band communication manner is adopted to transmit the CEP, the method provided by the embodiment of the present application transmits, when the non-emergency data needs to be transmitted, the CEP for which the transmission delay requirement is low by using the out-of-band communication manner with the better communication quality, which is beneficial to improving the demodulation success rate of the data packet, and when the emergency data needs to be transmitted, transmits the CEP for which the transmission delay requirement is higher by using the in-band communication, thereby ensuring that the wireless power transmitting device can process the CEP in time in the case that the emergency data needs to be transmitted.

Figure 5:
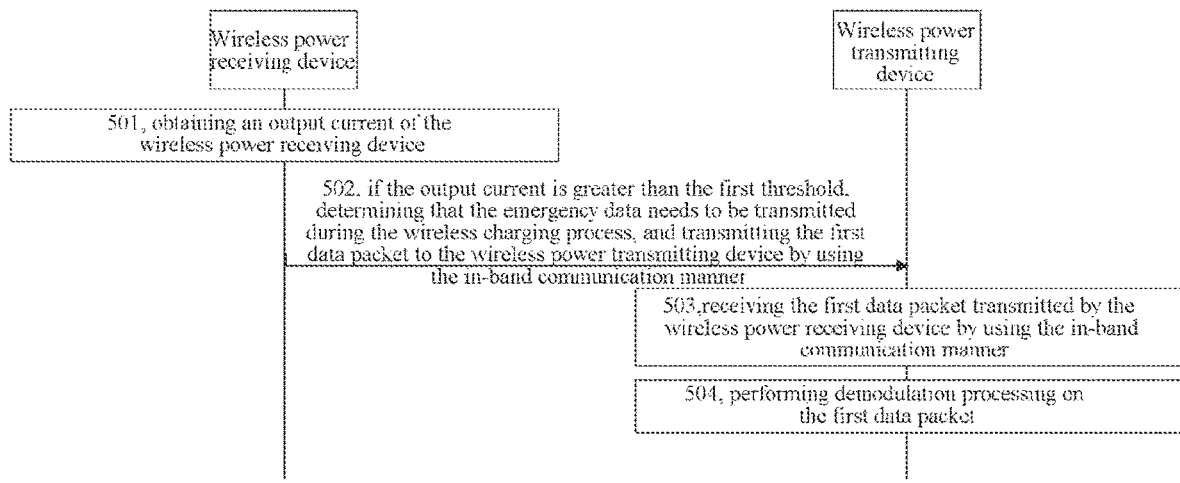
FIG. 5 shows a flowchart of a communication method for wireless charging according to another exemplary embodiment.

FIG. 5 is a flowchart of a communication method for wireless charging according to another exemplary embodiment. In the embodiment, the emergency status is related to an output current. The method includes the following steps.

In step 501, the wireless power receiving device obtains an output current of the wireless power receiving device.

In an embodiment, an abnormal output current of the wireless power receiving device may relate to the circuit being short circuited and the received power being large. If the wireless charging is continued under the case where the output current is abnormal, the wireless power receiving device may be damaged. Therefore, during the wireless charging process, the wireless power receiving device may continuously obtain an output current, and detect whether the output current is greater than a first threshold. If the output current is greater than a first threshold, it is determined that the output current is abnormal, and the step 502 is performed.

In the step 502, if the output current is greater than the first threshold, the wireless power receiving device determines that the emergency data needs to be transmitted during the wireless charging process, and transmits a first data packet to the wireless power transmitting device by using the in-band communication manner.

In order to improve the security of the wireless power transmitting device, if the output current is greater than the first threshold, the wireless power receiving device determines that the emergency data needs to be transmitted during the current wireless charging process, and selects the in-band communication manner with a lower transmission delay to transmit the first data packet to the wireless power transmitting device instead of using the out-of-band communication manner with a higher transmission delay.

In an embodiment, when the emergency data needs to be transmitted, the first data packet is used to indicate to stop transmitting power. The first data packet may be an end power transfer (EPT) packet based on the QI protocol, which is not limited in this embodiment.

In an embodiment, the wireless power receiving device obtains the current output current to be 2 A. Since the current output current is greater than the first threshold 1 A, the wireless power receiving device determines that the emergency data needs to be transmitted during the wireless charging process, and transmits the EPT packet to the wireless power transmitting device by using the in-band communication manner.

In step 503, the wireless power transmitting device receives the first data packet transmitted by the wireless power receiving device by using the in-band communication manner.

In the embodiment, the wireless power transmitting device simultaneously enables the in-band communication and the out-of-band communication. When the wireless power receiving device transmits the first data packet by using the in-band communication manner, the wireless power transmitting device can receive the first data packet in the in-band communication manner in time.

In step 504, the wireless power transmitting device performs demodulation processing on the first data packet.

In an embodiment, when the emergency data needs to be transmitted, the wireless power transmitting device obtains the first data packet, and stops transmitting the power according to the first data packet. When the output current of the wireless power receiving device is within the normal range, the wireless power receiving device re-establishes the wireless charging communication with the wireless power transmitting device, and performs the power transmission.

In this embodiment, during the wireless charging process, the wireless power receiving device obtains its own output current, and determines that the emergency data needs to be transmitted during the wireless charging process when the output current is greater than the first threshold, thereby adopting an in-band communication in which the transmission delay is low, to transmit the first data packet to the wireless power transmitting device, ensuring that the wireless power transmitting device can stop the power transmission according to the first data packet in time, and avoid causing damage to the wireless power receiving device by continuing the power transmission.

Figure 6:
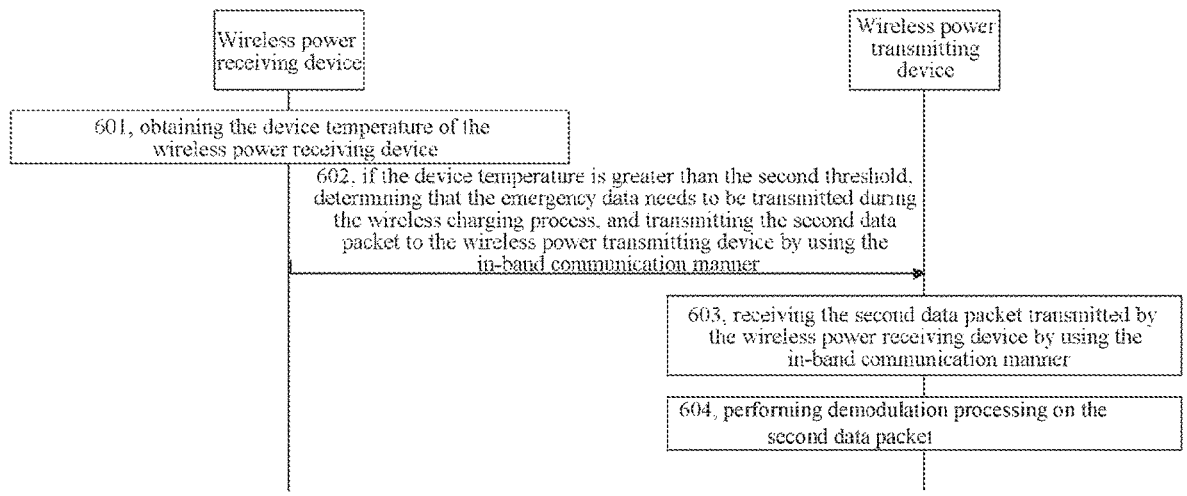
FIG. 6 shows a flowchart of a communication method for wireless charging according to another exemplary embodiment.

FIG. 6 is a flowchart of a communication method for wireless charging according to another exemplary embodiment. In the embodiment, the emergency status is related to a device temperature. The method includes the following steps.

In step 601, the wireless power receiving device obtains the device temperature of the wireless power receiving device.

Since the device generates heat during the charging process, and when the device temperature is too high, continued charging may cause damage to the device. Therefore, the wireless power receiving device may continuously obtain the device temperature during the wireless charging process, and detect whether the device temperature is greater than a second threshold. If the device temperature is greater than the second threshold, the device temperature is determined to be too high, and step 602 is performed.

Referring to FIG. 2, in an embodiment, when the wireless power receiving device needs to obtain the device temperature, the wireless power receiving chip 201 transmits a request for obtaining the device temperature to the second CPU 202. After receiving the request, the second CPU 202 feeds back the current device temperature to the wireless power receiving chip 201, and the wireless power receiving chip 201 compares the obtained device temperature with the second threshold to determine whether the emergency data needs to be transmitted during the wireless charging process. If the device temperature is higher than the second threshold, it is determined the emergency data needs to be transmitted during the wireless charging process.

Referring back to FIG. 6, in step 602, if the device temperature is greater than the second threshold, the wireless power receiving device determines that the emergency data needs to be transmitted during the wireless charging process, and transmits a second data packet to the wireless power transmitting device by using the in-band communication manner.

In order to improve the security of the wireless power transmitting device, if the device temperature is greater than the second threshold, the wireless power receiving device determines that the emergency data needs to be transmitted during the current wireless charging process, and selects the in-band communication manner with a lower transmission delay to transmit the second data packet to the wireless power transmitting device instead of using the out-of-band communication manner with a higher transmission delay.

In an embodiment, when the emergency data needs to be transmitted, the second data packet is used to indicate to stop transmitting power. The second data packet may be the EPT packet, which is not limited in this embodiment.

In an embodiment, the wireless power receiving device obtains the current device temperature to be 60 degrees Celsius, and since the current device temperature is greater than the second threshold of 50 degrees Celsius, the wireless power receiving device determines that the emergency data needs to be transmitted during the wireless charging process, and transmits the EPT packet to the wireless power transmitting device by using the in-band communication manner.

In step 603, the wireless power transmitting device receives the second data packet transmitted by the wireless power receiving device by using the in-band communication manner.

In the embodiment, the wireless power transmitting device simultaneously enables the in-band communication and the out-of-band communication. When the wireless power receiving device transmits the second data packet by using the in-band communication manner, the wireless power transmitting device can receive the second data packet in the in-band communication manner in time.

In step 604, the wireless power transmitting device performs demodulation processing on the second data packet.

In an embodiment, when the emergency data needs to be transmitted, the wireless power transmitting device obtains the second data packet, and stops transmitting the power according to the second data packet. When the output current of the wireless power receiving device is within the normal range, the wireless power receiving device re-establishes the wireless charging communication with the wireless power transmitting device, and performs the power transmission.

In this embodiment, during the wireless charging process, the wireless power receiving device obtains its own device temperature, and determines that the emergency data needs to be transmitted during the wireless charging process when the device temperature is greater than the second threshold, thereby an in-band communication with a low transmission delay is adopted to transmit the second data packet to the wireless power transmitting device, so that the wireless power transmitting device can stop the power transmission according to the second data packet in time, which can avoid causing damage to the wireless power receiving device by continuing the power transmission.

Figure 7:
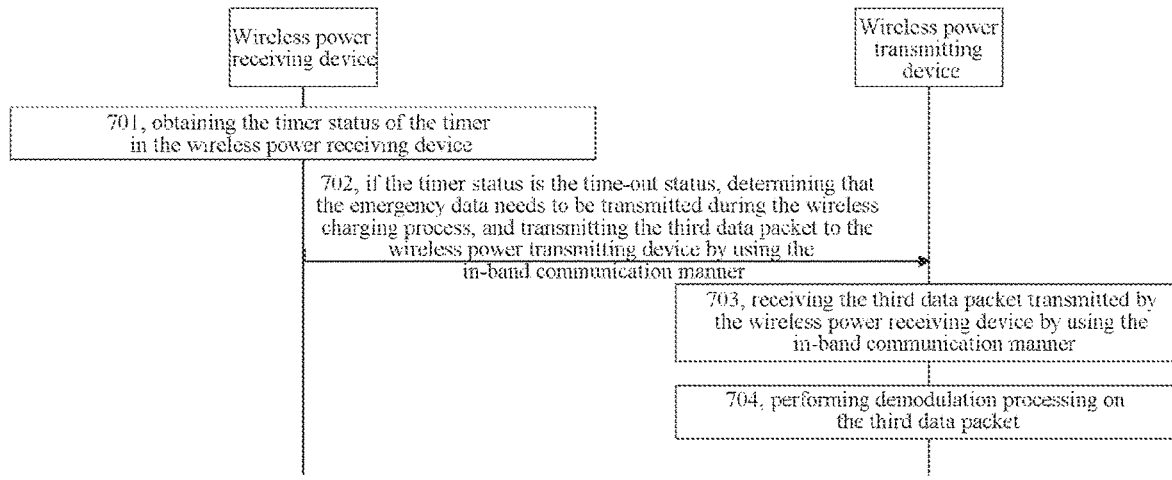
FIG. 7 shows a flowchart of a communication method for wireless charging according to another exemplary embodiment.

FIG. 7 is a flowchart of a communication method for wireless charging according to an exemplary embodiment. In the embodiment, the emergency status is related to a timer status. The method includes the following steps.

In step 701, the wireless power receiving device obtains the timer status of the timer in the wireless power receiving device.

In an embodiment, the timer is configured to trigger the wireless power receiving device to transmit a third data packet to the wireless power transmitting device when the timer duration is reached, wherein the third data packet is used to instruct the wireless power transmitting device to adjust the transmission power, adjust the transmission current, adjust the transmission voltage or stop the power transmission, and the embodiment of the present application does not limit the specific use of the third data packet.

In an embodiment, the timer duration is a first duration of a first timer, and the first timer is configured to trigger the wireless power receiving device to transmit the EPT packet to the wireless power transmitting device when the first duration is reached, thereby stopping the power transmission. In an embodiment, the timer duration is a second duration of a second timer, and the second timer is configured to trigger the wireless power receiving device to transmit a CEP to the wireless power transmitting device when the second duration is reached, thereby instructing the wireless power transmitting device to reduce the transmission power.

In an embodiment, the timer status includes a time-out status (the timer duration is reached) and an untime-out status (the timer duration is not reached). When it is detected that the timer status is the time-out status, the wireless power receiving device performs step 702; while when it is detected that the timer status is the untime-out status, the wireless power receiving device continues to detect the timer status.

In step 702, if the timer status is the time-out status, the wireless power receiving device determines that the emergency data needs to be transmitted during the wireless charging process, and transmits the third data packet to the wireless power transmitting device by using the in-band communication manner.

In order to make the wireless power transmitting device to process the third data packet as soon as possible, when the timer is in the time-out status, the wireless power receiving device transmits the third data packet by using the in-band communication manner with a low transmission delay, instead of using the out-of-band communication manner with a higher transmission delay.

In an embodiment, after the third data packet is transmitted to the wireless power transmitting device in the in-band communication manner, the wireless power receiving device turns off the timer.

In step 703, the wireless power transmitting device receives the third data packet transmitted by the wireless power receiving device by using the in-band communication manner.

In the embodiment, the wireless power transmitting device simultaneously enables the in-band communication and the out-of-band communication. When the wireless power receiving device transmits the third data packet by using the in-band communication manner, the wireless power transmitting device can receive the third data packet in the in-band communication manner in time.

In step 704, the wireless power transmitting device performs demodulation processing on the third data packet.

In an embodiment, if the third data packet (e.g., the EPT packet) is transmitted by the wireless power transmitting device when the first timer is in an time-out status, the wireless power transmitting device stops power transmission according to the third data packet; if the third data packet (e.g., the EPT packet) is transmitted by the wireless power transmitting device when the second timer is in an time-out status, the wireless power transmitting device adjusts at least one of the voltage, the current, or the operating frequency according to the third data packet to reduce the power transmission.

In this embodiment, during the wireless charging process, the wireless power receiving device obtains the timer status of the timer, and determines that the emergency data needs to be transmitted during the wireless charging process when the timer status is the timed status, thereby transmitting the third data packet to the wireless power transmitting device by using the in-band communication manner with a low transmission delay, so that the wireless power transmitting device can process the third data packet in time in the case that the emergency data needs to be transmitted.

In the related art, when the in-band communication is used, if the wireless power transmitting device does not receive the data packet transmitted by the wireless power receiving device within a predetermined duration (for example, 1.25 s), the wireless power transmitting device stops power output, thereby reducing power consumption.

In various embodiments of the present application, since there are both the in-band communication manner and the out-of-band communication manner between the devices, the in-band communication and the out-of-band communication have respective delay mechanisms. In an embodiment, if the data packet transmitted in the in-band communication manner is not received within the first predetermined duration (such as 1.25 s), the wireless power transmitting device determines that the in-band communication fails; if the data packet transmitted in the out-of-band communication manner is not received within the second predetermined duration (for example, 3 s), the wireless power transmitting device determines that the out-of-band communication fails. In an embodiment, the first predetermined duration is less than the second predetermined duration. In addition, when the in-band communication fails and the out-of-band communication fails, the wireless power transmitting device stops the power output, thereby reducing power consumption.

It should be noted that, in the foregoing various embodiments, steps performed by the wireless power transmitting device may or may not be a part of a communication method for the wireless charging on the wireless power transmitting device side; and steps performed by the wireless power receiving device may or may not be a part of a communication method for the wireless charging on the wireless power receiving device side.

Figure 8:
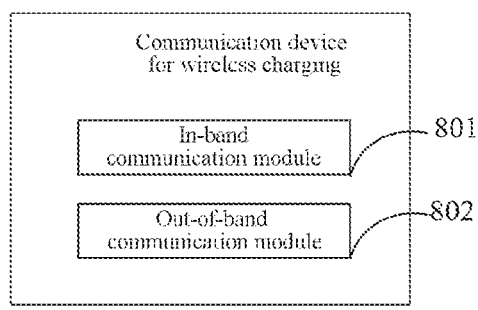
FIG. 8 shows a block diagram of a communication device for wireless charging according to an exemplary embodiment.

FIG. 8 is a block diagram of a communication device for wireless charging according to an exemplary embodiment. The device can be implemented as all or part of a wireless power receiving device by software, hardware or a combination of both. The device includes: an in-band communication module 801, configured to transmit a data packet to a wireless power transmitting device by using an in-band communication manner, if emergency data needs to be transmitted during a wireless charging process; and an out-of-band communication module 802, configured to transmit a data packet to the wireless power transmitting device by using an out-of-band communication manner, if non-emergency data needs to be transmitted during the wireless charging process; wherein a requirement for a transmission delay of the emergency data is higher than a requirement for a transmission delay of the non-emergency data.

In an embodiment, the device further includes: a first obtaining module, configured to obtain a control error value included in a control error packet (CEP), wherein the CEP is used to instruct the wireless power transmitting device to adjust at least one of a voltage, a current, and an operating frequency; a first determining module, configured to determine that the emergency data needs to be transmitted during the wireless charging process, if the control error value is greater than an error threshold; and a non-emergency data determining module, configured to determine that the non-emergency data needs to be transmitted during a wireless charging process; if the control error value is less than the error threshold.

In an embodiment, the device further includes: a second obtaining module, configured to obtain an output current of the wireless power receiving device; and a second determining module, configured to determine that the emergency data needs to be transmitted during the wireless charging process, if the output current is greater than a first threshold.

In an embodiment, the in-band communication module 801 includes: a first communication sub-module, configured to transmit a first data packet to the wireless power transmitting device by using the in-band communication manner, wherein the first data packet is used to indicate to stop transmitting power.

In an embodiment, the device further includes: a third obtaining module, configured to obtain a device temperature of the wireless power receiving device; and a third determining module, configured to determine that the emergency data needs to be transmitted during the wireless charging process, if the device temperature is greater than a second threshold.

In an embodiment, the in-band communication module 801 includes: a second communication sub-module, configured to transmit a second data packet to the wireless power transmitting device by using the in-band communication manner, wherein the second data packet is used to indicate to stop transmitting power.

In an embodiment, the device further includes: a fourth obtaining module, configured to obtain a timer status of a timer in the wireless power receiving device, wherein the timer is used to trigger the wireless power receiving device to transmit a third data packet; a fourth determining module, configured to determine that the emergency data needs to be transmitted during the wireless charging process, if the timer status is a time-out status.

In an embodiment, the in-band communication module 801 includes: a third communication sub-module, configured to transmit the third data packet to the wireless power transmitting device by using the in-band communication manner.

In an embodiment, the device further includes: a priority generation module, configured to generate a data packet corresponding to the emergency data preferentially, if the emergency data needs to be transmitted during the wireless charging process.

In an embodiment, the out-of-band communication manner includes at least one of bluetooth, near field communication (NFC), or ZigBee.

Figure 9:
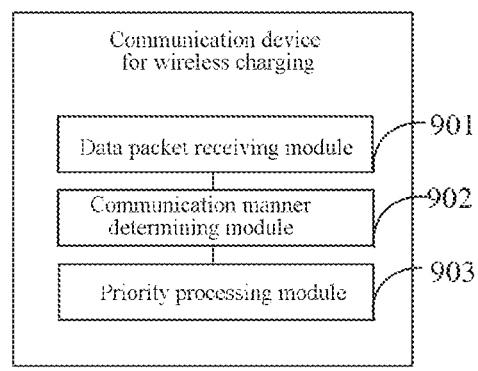
FIG. 9 shows a block diagram of a communication device for wireless charging according to an exemplary embodiment.

FIG. 9 is a block diagram of a communication device for wireless charging according to an exemplary embodiment. The device can be implemented as all or part of a wireless power transmitting device by software, hardware or a combination of both. The device includes: a data packet receiving module 901, configured to receive a data packet transmitted by a wireless power receiving device; a communication manner determining module 902, configured to determine a communication manner used when transmitting the data packet, wherein the communication manner includes an in-band communication manner and an out-of-band communication manner; a priority processing module 903, configured to process the data packet transmitted in the in-band communication manner preferentially.

In an embodiment, the device further includes: a first communication waiting module, configured to determine that the in-band communication fails, if the data packet transmitted in the in-band communication manner is not received within a first predetermined duration; a second communication waiting module, configured to determine that the out-of-band communication fails, if the data packet transmitted in the out-of-band communication manner is not received within a second predetermined duration; and a communication stopping module, configured to stop the wireless charging, if the in-band communication fails and the out-of-band communication fails.

In an embodiment, the out-of-band communication manner includes at least one of Bluetooth, near field communication (NFC), or ZigBee.

Figure 10:
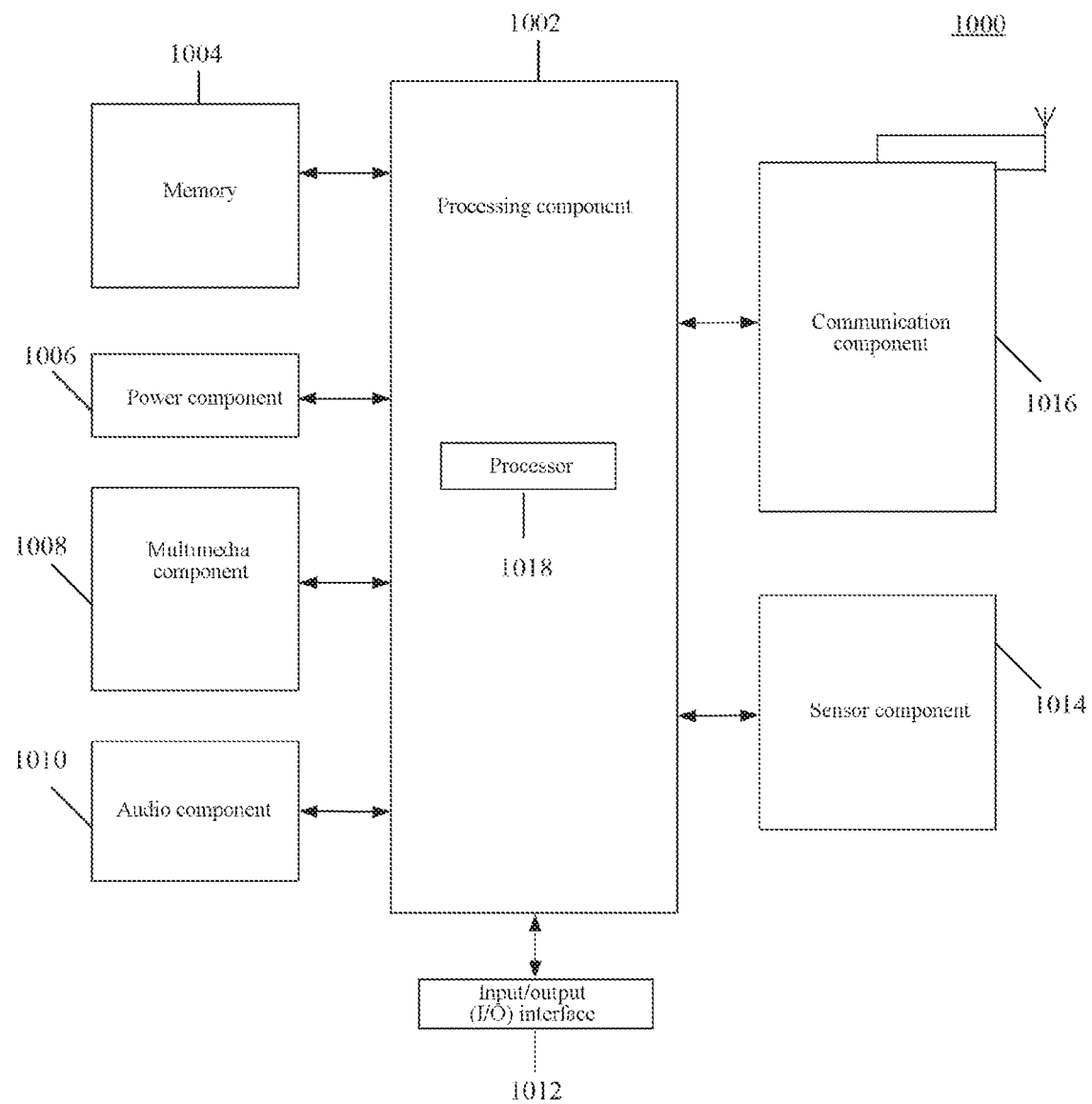
FIG. 10 shows a schematic diagram of a terminal for wireless charging according to an exemplary embodiment.

FIG. 10 is a schematic diagram of a terminal 1000 for wireless charging according to an exemplary embodiment. The terminal 1000 can be implemented as a wireless power receiving device or a wireless power transmitting device. The terminal 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls the overall operations of the terminal 1000, such as the operations associated with display, telephone calls, data communications, camera operations, and recording operations. The processing component 1002 can include one or more processors 1018 to execute instructions to perform all or part of the steps in the above described methods. Moreover, the processing component 1002 can include one or more modules to facilitate the interaction between the processing component 1002 and other components. For example, the processing component 1002 can include a multimedia module to facilitate the interaction between the multimedia component 1008 and the processing component 1002.

The memory 1004 is configured to store various types of data to support the operation of the terminal 1000. Examples of such data include instructions for any application or method operated on the terminal 1000, such as the contact data, the phone book data, messages, pictures, videos, and the like. The memory 1004 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the terminal 1000. The power component 1006 can include a power management system, one or more power sources, and other components associated with the generation, management, and distribution of power in the terminal 1000.

The multimedia component 1008 includes a screen providing an output interface between the terminal 1000 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. The screen may be a flexible screen provided in above embodiments. In some embodiments, the multimedia component 1008 includes a front camera and/or a rear camera. When the terminal 1000 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1010 is configured to output and/or input an audio signal. For example, the audio component 1010 includes a microphone (MIC) configured to receive an external audio signal when the terminal 1000 is in an operation mode, such as a call mode, a recording mode, and a voice recognition mode. The received audio signal may be further stored in the memory 1004 or transmitted via the communication component 1016. In some embodiments, the audio component 1010 also includes a speaker for outputting the audio signal.

The I/O interface 1012 provides an interface between the processing component 1002 and peripheral interface modules, such as a keyboard, a click wheel, buttons, and the like. These buttons may include, but are not limited to, a home button, a volume button, a starting button, and a locking button.

The sensor component 1014 includes one or more sensors for providing status assessments of various aspects of the terminal 1000. For example, the sensor component 1014 can detect an open/closed status of the terminal 1000. For example, the sensor component 1014 may be the display and the keypad of the terminal 1000. The sensor component 1014 can also detect a change in position of one component of the terminal 1000 or the terminal 1000, the presence or absence of user contact with the terminal 1000, an orientation, or an acceleration/deceleration of the terminal 1000, and a change in temperature of the terminal 1000. The sensor component 1014 can also include a light sensor, such as a CMOS or CCD image sensor, configured to use in imaging applications. In some embodiments, the sensor component 1014 can also include an accelerometer sensor, a gyroscope sensor, a magnetic sensor, a pressure sensor, or a temperature sensor.

The communication component 1016 is configured to facilitate wired or wireless communication between the terminal 1000 and other devices. The terminal 1000 can access a wireless network based on a communication standard, such as WiFi, 4G or 5G, or a combination thereof. In an exemplary embodiment, the communication component 1016 receives broadcast signals or broadcast associated information from an external broadcast management system via a broadcast channel. In an exemplary embodiment, the communication component 1016 also includes a near field communication (NFC) module to facilitate short-range communications.

In an exemplary embodiment, the terminal 1000 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In an exemplary embodiment, there is also provided a non-transitory computer-readable storage medium including instructions, such as the memory 1004 including instructions executable by the processor 1018 of the terminal 1000 to perform the above described method. For example, the non-transitory computer readable storage medium may be a ROM, a random access memory (RAM), a CD-ROM, a magnetic tape, a floppy disc, and an optical data storage device.

Embodiments of the present application further provide a computer readable medium, wherein the computer readable medium stores at least one instruction loaded and executed by the processor to implement the communication method for wireless charging as described above.

Embodiments of the present application further provide a computer program product, wherein the computer program product stores at least one instruction loaded and executed by the processor to implement the communication method for wireless charging as described above.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A communication method for wireless charging, applied to a wireless power receiving device, comprising:
   transmitting a data packet to a wireless power transmitting device by in-band communication, if emergency data needs to be transmitted during a wireless charging process; and
   transmitting the data packet to the wireless power transmitting device by out-of-band communication, if non-emergency data needs to be transmitted during the wireless charging process;
   wherein a requirement for a transmission delay of the emergency data is higher than a requirement for a transmission delay of the non-emergency data,
   wherein the method further comprises:
   obtaining a control error value included in a control error packet (CEP), wherein the CEP is configured to instruct the wireless power transmitting device to adjust at least one of a voltage, a current, and an operating frequency; determining that the emergency data needs to be transmitted during the wireless charging process, if the control error value is greater than an error threshold; and determining that the non-emergency data needs to be transmitted during the wireless charging process, if the control error value is less than the error threshold; or
   obtaining an output current of the wireless power receiving device; and determining that the emergency data needs to be transmitted during the wireless charging process, if the output current is greater than a first threshold; wherein the transmitting a data packet to a wireless power transmitting device by in-band communication includes: transmitting a first data packet to the wireless power transmitting device by the in-band communication, wherein the first data packet is configured to indicate to stop transmitting power; or
   obtaining a device temperature of the wireless power receiving device; and determining that the emergency data needs to be transmitted during the wireless charging process, if the device temperature is greater than a second threshold; wherein the transmitting a data packet to a wireless power transmitting device by in-band communication includes: transmitting a second data packet to the wireless power transmitting device by the in-band communication, wherein the second data packet is configured to indicate to stop transmitting power; or
   obtaining a timer status of a timer in the wireless power receiving device, wherein the timer is configured to trigger the wireless power receiving device to transmit a third data packet; and determining that the emergency data needs to be transmitted during the wireless charging process, if the timer status is a time-out status; wherein the transmitting a data packet to a wireless power transmitting device by in-band communication includes: transmitting the third data packet to the wireless power transmitting device by the in-band communication.

2. The method according to claim 1, further comprising:
   generating a data packet corresponding to the emergency data preferentially, if the emergency data needs to be transmitted during the wireless charging process.

3. The method according to claim 1, wherein the out-of-band communication includes at least one of Bluetooth, near field communication (NFC), or ZigBee.

4. A wireless power receiving device, comprising:
a processor; and
a memory for storing instructions executable by the processor;
wherein the processor is configured to:
transmit a data packet to a wireless power transmitting device by in-band communication, if emergency data needs to be transmitted during a wireless charging process; and
transmit the data packet to the wireless power transmitting device by out-of-band communication, if non-emergency data needs to be transmitted during the wireless charging process;
wherein a requirement for a transmission delay of the emergency data is higher than a requirement for a transmission delay of the non-emergency data,
wherein the processor is further configured to:
obtain a control error value included in a control error packet (CEP), wherein the CEP is configured to instruct the wireless power transmitting device to adjust at least one of a voltage, a current, and an operating frequency; determine that the emergency data needs to be transmitted during the wireless charging process, if the control error value is greater than an error threshold; and determine that the non-emergency data needs to be transmitted during the wireless charging process, if the control error value is less than the error threshold; or
obtain an output current of the wireless power receiving device; determine that the emergency data needs to be transmitted during the wireless charging process, if the output current is greater than a first threshold; and transmit a first data packet to the wireless power transmitting device by the in-band communication, wherein the first data packet is configured to indicate to stop transmitting power; or
obtain a device temperature of the wireless power receiving device; determine that the emergency data needs to be transmitted during the wireless charging process, if the device temperature is greater than a second threshold; and transmit a second data packet to the wireless power transmitting device by the in-band communication, wherein the second data packet is configured to indicate to stop transmitting power; or
obtain a timer status of a timer in the wireless power receiving device, wherein the timer is configured to trigger the wireless power receiving device to transmit a third data packet; determine that the emergency data needs to be transmitted during the wireless charging process, if the timer status is a time-out status; and transmit the third data packet to the wireless power transmitting device by the in-band communication.

5. The wireless power receiving device according to claim 4, wherein the processor is further configured to:
generate a data packet corresponding to the emergency data preferentially, if the emergency data needs to be transmitted during the wireless charging process.

6. The wireless power receiving device according to claim 4, wherein the out-of-band communication includes at least one of Bluetooth, near field communication (NFC), or ZigBee.

* * * * *